United States Patent [19]

Toral et al.

[11] Patent Number: 5,034,843
[45] Date of Patent: Jul. 23, 1991

[54] RESILIENT PROTRUSION FOR POSITIONING IN A SPOOL OF A MAGNETIC TAPE CASSETTE

[75] Inventors: José Toral, Munich; Gottfried Lutz, Seefeld; Hermann Brandstetter, Munich, all of Fed. Rep. of Germany

[73] Assignee: BASF Aktiengesellschaft, Ludwigshafen, Fed. Rep. of Germany

[21] Appl. No.: 367,389

[22] Filed: Jun. 16, 1989

[30] Foreign Application Priority Data

Jul. 2, 1988 [DE] Fed. Rep. of Germany ... 8808498[U]

[51] Int. Cl.⁵ .................... G11B 23/04; G11B 15/32
[52] U.S. Cl. ........................... 360/132; 242/199
[58] Field of Search .............. 360/132; 242/199, 197, 242/198, 194, 193

[56] References Cited

U.S. PATENT DOCUMENTS

| | | | |
|---|---|---|---|
| 2,612,565 | 9/1952 | Heller | 360/132 |
| 3,869,099 | 3/1975 | Inaga | 360/93 |
| 3,900,170 | 8/1975 | Serizawa | 360/132 |
| 3,900,171 | 8/1975 | Serizawa | 360/132 |
| 4,473,198 | 9/1984 | Pertzsch et al. | 242/197 |
| 4,561,609 | 12/1985 | Collins et al. | 242/199 |
| 4,887,775 | 12/1989 | Kanaguchi et al. | 242/199 |
| 4,896,238 | 1/1990 | Oogi et al. | 360/132 |

FOREIGN PATENT DOCUMENTS

0186180 10/1984 Japan ................... 242/199

*Primary Examiner*—John H. Wolff
*Assistant Examiner*—Craig A. Renner
*Attorney, Agent, or Firm*—Connolly & Hutz

[57] ABSTRACT

A video cassette consists of an upper cassette part (8) and a lower cassette part (6), at least one reel which is located therein and onto which magnetic tape can be wound, in which a pressing spring resiliently loads the tape reels (1, 2) in the direction of a defined operating position, the hub (3) of the tape reels having on its side facing the upper cassette part a centrally arranged sleeve-shaped recess (11). According to the invention, there is seated in the recess a helical spring (10), which is resiliently supported in the recess and in the other end of which there is fitted a pin (12), which consists of abrasion-resistant material and the upper end (7) of which bears against the upper cassette part (8) in the assembled cassette state (FIG. 2).

3 Claims, 1 Drawing Sheet

RESILIENT PROTRUSION FOR POSITIONING IN A SPOOL OF A MAGNETIC TAPE CASSETTE

INTRODUCTION

The innovation relates to a magnetic tape cassette, in particular a video cassette, in which a pressing spring resiliently loads one or more tape reels in the direction of a defined operating position.

BACKGROUND OF THE INVENTION

Most video cassettes on the market, of the VHS and Beta video systems, as well as 8 mm cassettes, have pressing springs. In these cases, most of the coplanararranged reels are pressed in the direction of the lower housing half by springs fastened within the upper housing half, punched out of spring sheet and curved. As a result, when the cassettes are loaded into corresponding playback equipment, a uniform resting of the reels on the hub receptacles on the equipment and a smooth running of the reels during playback of the tape are achieved. The size, shape and possibly the spring forces of the pressing springs are differently designed and dimensioned, respectively, depending on cassettes used, their reels and their reel spacings. The ends of the pressing springs rest on a usually spherically shaped projection of the reel hubs. It is known from U.S. Pat. No. 4 473 198 that this projection is a ball, which consists of a hard material, for example polyoxymethylene (POM), which is fitted in a centrally arranged recess of the reel hub.

A disadvantage of this design of video cassettes, known from the prior art, is that the fastening of the pressing springs requires a special operation during the assembly of the cassette housing, as well as the price of the springs, their stockkeeping and their testing.

SUMMARY OF THE INVENTION

Therefore, the object was to find a magnetic tape cassette of the generic type mentioned above which is of simpler design and is simple to put together. According to the innovation, the object was achieved by a magnetic tape cassette having an upper part and a lower part, reels located within the cassette resiliently loaded into an operating position by a pin and helical spring seated in a recess in the hub of a reel. The pin has a head defined by a rounded-off outer surface and a flat radial inner surface. The spring is coiled around the pin shank and seats in the recess while bearing against the flat radical surface to provide the pressure directing the spool to an operating position. The round-off outer surface bears against the upper part of the cassette under the resilient action of the helical spring.

BRIEF DESCRIPTION OF THE DRAWINGS

Further details of the innovation emerge from the subclaims, the drawings and the description.

The innovation is explained in more detail below with reference to the drawings, in which.

DETAILED DESCRIPTION

Figure 1:
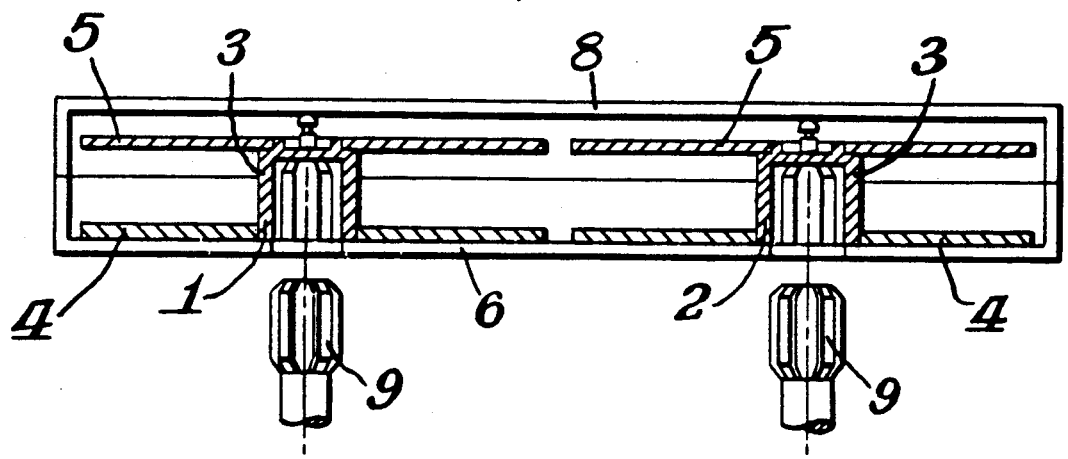
FIG. 1 shows a commercially available video cassette with tape reels and with the pressing device according to the innovation for the tape reels, in longitudinal section
Figure 2:
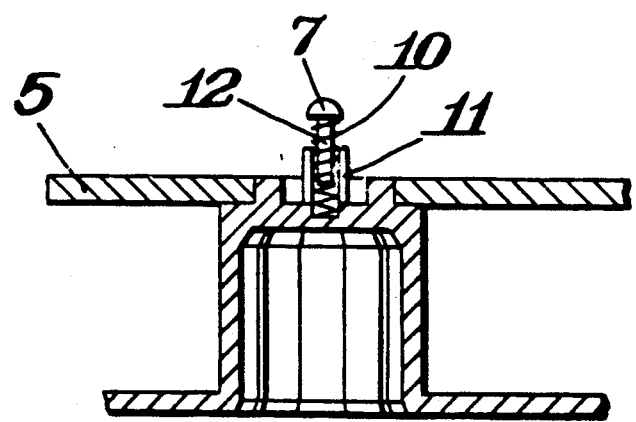
FIG. 2 shows details of the pressing device, in longitudinal section, according to FIG. 1.

FIG. 1 shows, in longitudinal section, a video cassette of the VHS type with fitted, coplanar-arranged reels (1, 2). These are made up in each case of a winding hub (3) for the winding-up of the magnetic tape and two flanges (4, 5), which are seated at the upper and lower ends of the winding hubs. In practice, the upper flange is often not put on until the tape has been wound onto the winding hub. During loading of the cassette into a recorder, the drive spindles (9), which engage into the hollow winding hubs from below, lift the reels off the bottom of the cassette (6) and press them in the direction of the upper cassette part (8). During removal from the equipment, the reels are again lowered onto the lower cassette part (6).

The essence of the innovation is that the winding hub (3) has on its side facing the upper cassette part a centrally arranged sleeve-shaped recess (11), in which there is fitted a helical spring (10). This is supported with its lower end against the bottom of the recess, while at its upper end there is fitted a pin (12), which consists of abrasion-resistant material and the upper end of which bears against the upper cassette part (8) in the assembled state of the video cassette. In a preferred design, this pin (12) is shaped in the form of a champagne cork and is supported with its rounded-off head (7) against the inside of the upper cassette part (8). The point of support may either be the opaque cassette housing or the viewing window. In this arrangement, to avoid abrasion at this point, a small plate of abrasion-resistant material may be stuck on.

The pin (12) preferably consists of hard plastic, for example polyoxymethylene, while the remaining reel body consists as usual of an acrylonitrile-butadiene-styrene copolymer (ABS).

The above description makes it clear that the pressing device according to the innovation is very simple to produce and to assemble. The POM pin is fitted into one end of the helical spring, until it is seated with its rounded-off head on the expediently tapered opening of the spring end. Thereafter, the spring with the POM pin can be fitted into the projection of the winding hub, in which it is firmly seated resiliently. The further assembly of the video cassette takes place as usual in the existing automatic assembly machines.

The production costs of the video cassette according to the innovation can be reduced distinctly with the features described and also do not require major modifications of existing injection-moulding tools for the cassette parts. Also, it is not necessary to replace the existing automatic assembly machines by other types.

We claim:

1. In combination, a video cassette consisting of an upper cassette part and a lower cassette part,
   at least one reel located within said cassette and capable of carrying a wound magnetic tape,
   said reel being resiliently loaded in the direction of an operating position,
   a reel hub having a surface arranged facing said upper cassette part, said hub having a recess formed therein extending inward from said surface axially of said hub
   a pin consisting of abrasion-resistant material and positioned in said recess with its axis arranged substantially axial of said hub and comprised of shank and head portions, said head portion being defined by a rounded-off surface and a flat radial surface and a helical spring around the pin shank seated in the hub recess and bearing against the flat radial surface and the pin is spaced away from frictional contact with the hub, so constructed and arranged that said spring is resiliently supported in said recess, the rounded-off surface bearing against the upper cassette part under the resilience of the helical spring provides pressure on the reel.

2. The combination of claim 1, characterized in that the pin consists of polyoxymethylene and the remaining reel body is made up of an acrylonitrile-butadiene-styrene copolymer (ABS).

3. The combination of claim 1, characterized in that the point of bearing of the pin on the upper cassette part consists of abrasion-resistant material.

* * * * *